United States Patent [19]

Kondo et al.

[11] Patent Number: 5,001,016
[45] Date of Patent: Mar. 19, 1991

[54] HEAT SHRINKABLE COMPOSITE FILM AND PACKAGING METHOD USING SAME

[75] Inventors: Kazuo Kondo; Nobuya Ishiguro, both of Marugame, Japan

[73] Assignee: Okura Industrial Co., Ltd., Marugame, Japan

[21] Appl. No.: 515,149

[22] Filed: Apr. 26, 1990

Related U.S. Application Data

[62] Division of Ser. No. 162,451, Mar. 1, 1988, Pat. No. 4,923,722.

[30] Foreign Application Priority Data

| Mar. 2, 1987 | [JP] | Japan | 62-48444 |
| Jun. 23, 1987 | [JP] | Japan | 62-157123 |
| Aug. 27, 1987 | [JP] | Japan | 62-214671 |
| Aug. 27, 1987 | [JP] | Japan | 62-214672 |

[51] Int. Cl.$^5$ ............................................. B32B 27/08
[52] U.S. Cl. ........................ 428/516; 428/340; 428/910; 428/903.3
[58] Field of Search ............... 428/903.3, 516, 910, 428/340, 34.9

[56] References Cited

U.S. PATENT DOCUMENTS

| 3,754,063 | 8/1973 | Schirmer | 428/516 |
| 4,049,147 | 9/1977 | Stiles et al. | 428/34.9 |
| 4,277,578 | 7/1981 | Yoshimura | 525/211 |
| 4,302,557 | 11/1981 | Yoshimura | 525/211 |
| 4,336,212 | 6/1982 | Yoshimura | 264/22 |
| 4,336,350 | 6/1982 | Yoshimura | 525/211 |
| 4,379,888 | 4/1983 | Yoshimura | 525/211 |
| 4,390,385 | 6/1983 | Ferguson et al. | 428/516 |
| 4,430,378 | 2/1984 | Yoshimura | 428/213 |
| 4,755,403 | 7/1988 | Ferguson | 428/516 |

FOREIGN PATENT DOCUMENTS 55-118859 9/1980 Japan.

*Primary Examiner*—Edith Buffalow
*Attorney, Agent, or Firm*—Armstrong, Nikaido, Marmelstein, Kubovcik & Murray

[57] ABSTRACT

A heat shrinkable composite film comprises a core layer formed of (a) a straight chain, low density polyethylene having a density of 0.890–0.905 g/cm$^3$ and a Vicat softening point of 60°80° C. and/or (b) a copolymer of propylene and one or more α-olefins with 2–8 carbon atoms having a Vicat softening point of 70°110° C., and two outer layers laminated over the opposite surfaces of the core layer and each formed of (c) a crystalline polypropylene resin having a melting point of 135°150° C., the core layer having a thickness of 30–80% of the total thickness of the outer layers and the core layer.

3 Claims, 3 Drawing Sheets

HEAT SHRINKABLE COMPOSITE FILM AND PACKAGING METHOD USING SAME

This is a division, of application Ser. No. 162,451 filed Mar. 1, 1988 now U.S. Pat. No. 4,923,722.

BACKGROUND OF THE INVENTION

This invention relates to a heat shrinkable film useful for packaging applications.

Heat shrink packaging is a method in which an article to be packed is first loosely enclosed in a bag of a heat shrinkable thermoplastic film and, after sealing, the bag is subjected to an elevated temperature to cause the bag to shrink and to tightly encase the article under evacuation. Polyethylene resins, polypropylene resins and polyvinyl chloride resins are typical examples of the raw materials of such heat shrinkable films. Because of their clarity, gloss, moistureproof property and freeness of causing environmental pollution, polypropylene resins are especially widely used. However, heat shrinkable films of polypropylene resins require a higher temperature to effect heat shrinkage as compared with polyvinyl chloride resin films. Therefore, known heat shrinkable polypropyelene films have a narrow range of operativity, from the stand point of temperatures at which they must be shrunken.

To cope with this problem, attempts have been made to use a polypropylene resin in conjunction with another polymer in the form of a mixture or a laminate. For example, Japanese examined patent publication (Tokkyo Kokoku) No. 61-10483 suggests the use of a copolymer of propylene and ethylene. Japanese unexamined patent application (Tokkyo Kokai) No. 58-166049 discloses a heat shrinkable multilayer film having a core layer formed of a composition containing a linear low density polyethylene resin with a density of 0.910–0.925 g/cm$^3$ and sandwiched between two outer layers formed of an ethylenepropylene copolymer. Heat shrinkable multilayer films are also disclosed in Tokkyo Kokoku No. 54-20549 and Tokkyo Kokai No. 54152282 and No. 57-8156. One problem associated with known heat shrinkable multilayer films is concerned with difficulties in stretching.

Heat shrinkable films formed of a polypropylene resin also has a drawback that thin articles such as notebook and cards are deformed or curled during the heat shrink packaging. This problem is not involved in polyethylene films or polyvinyl chloride films. However, polyethylene films are poor in clarity and gloss and polyvinyl chloride films give rise to problems of generation of a bad odor during fuse-sealing or generation of harmful gases when spent films are combusted.

SUMMARY OF THE INVENTION

It is therefore an object of the present invention to provide a heat shrinkable film which is easy to manufacture and which is excellent in shrinkability.

Another object of the present invention is to provide a heat shrinkable film which may be shrunken in a wide temperature range to give tight packages free of looseness, wrinkles or curls.

It is a further object of the present invention to provide a heat shrinkable film which has a high fuse seal strength and a high tear-propagation strength.

It is a special object of the present invention to provide a heat shrinkable film of the above-mentioned type which is suitable for packaging deformable articles such as cards, notebooks and books without causing curls or deformation.

It is yet a further object of the present invention to provide a method of shrink packaging articles which can give packages with excellent tightness and yet without no curls.

In accomplishing the foregoing objects, the present invention provides a heat shrinkable composite film comprising a core layer formed of (a) a straight chain, low density polyethylene having a density of 0.890–0.905 g/cm$^3$ and a Vicat softening point of 60°–80° C. and/or (b) a copolymer of propylene and one or more $\alpha$-olefins with 2-8 carbon atoms having a Vicat softening point of 70°–110° C., and two outer layers laminated over the opposite surfaces of said core layer and each formed of (c) a crystalline polypropylene resin having a melting point of 135°–150° C., said core layer having a thickness of 30-80 % of the total thickness of said outer layers and said core layer.

In another aspect, the present invention provides a method of packaging an article which comprises providing the above heat shrinkable film exhibiting a shrinking force of not greater than 30 g in both longitudinal and transverse directions at temperatures providing a shrinkage percentage of at least 35% in both longitudinal and transverse directions and having a size not greater than 1.6 times the exterior surface area of the article, enclosing the article with the film, and heating said enclosure at a temperature so that the film can be shrunken with a shrinkage percentage of at least 35% in both longitudinal and transverse directions.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE INVENTION

Figure 1:
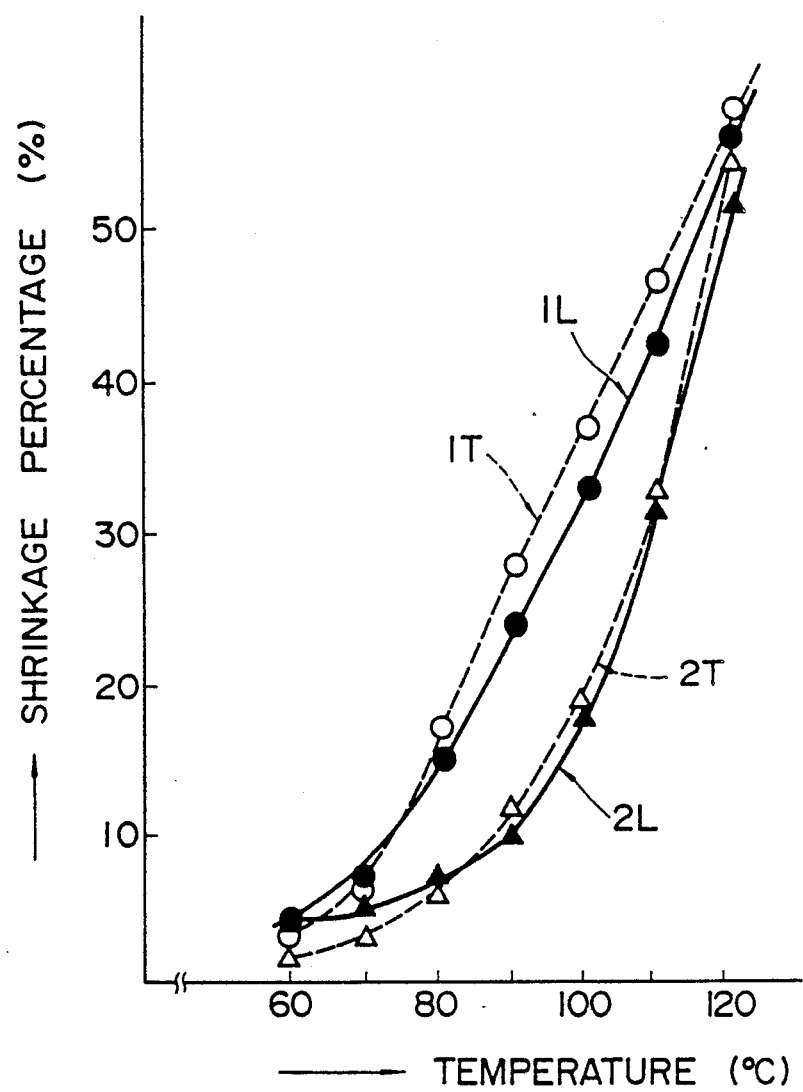
FIG. 1 is a graph showing the relationship between shrinking temperature and shrinkage percentage of composite films of the present invention (plotted by white and black circles) and of the conventional film (plotted by white and black triangles)

The crystalline polypropylene (c) to be used for each of the two outer layers of the composite film according to the present invention should have a melting point of 135°–150° C. When the melting point of the polypropylene exceeds 150 ° C., it becomes difficult to effect stretching at a low temperature and, therefore, it becomes necessary to conduct the stretching at a high temperature. This causes, however, lowering of the heat shrinkability of the film not only at a low temperature but also at a high temperature. A melting point of less than 135 ° C is also undesirable because the resulting film becomes poor in heat resistance and, therefore, the film tends to be fused and whitened during its passage through a heating tunnel. Further, it is difficult to improve the hot slipping property of the film which has been just discharged from the heating tunnel and is still hot.

The crystalline polypropylene is preferably an ethylene-propylene copolymer or an ethylene-propylene-butene copolymer. It is especially preferable to use as the crystalline polypropyrene a copolymer obtained by copolymerizing propylene with 2–4% by weight of ethylene or a copolymer obtained by copolymerizing propylene with 3–8% by weight of a mixture of ethylene and butene.

The straight chain, low density polyethylene (a) to be used as the core layer of the composite film of this invention should have a density of 0.890–0.905 g/cm$^3$ and a Vicat softening point of 60°–80° C.

A density of the polyethylene above 0.905 g/cm$^3$ is undesirable because the film becomes poor in stretchability so that the temperature range providing suitable shrinking operativity of the resulting oriented film becomes narrow. Further, such a high density causes lowering of the strength of bonding between layers of the laminate and reduction of the fuse sealing strength of the laminate. On the other hand, when the density of the polyethylene is below 0.890 g/cm$^3$, it becomes difficult to effect a heat treatment for eliminating spontaneous shrinkability from the heat-shrinkable composite film. Thus, the film tends to be deformed or to become poor in surface smoothness during the heat treatment.

When the Vicat softening point of the straight chain, low density polyethylene exceeds 80° C., it becomes difficult to effect stretching at a low temperature and, therefore, it becomes necessary to conduct the stretching at a high temperature. This causes, however, lowering of the heat shrinkability of the film at a low temperature so that the temperature range for suitably operating heat shrinking of the film becomes narrow. On the other hand, when a Vicat softening point is below 60° C., the core layer fails to be oriented satisfactorily at a temperature which is suitable for orienting the outer layers between which the core layer is provided, so that the heat shrinkability of the resulting composite film is not improved.

The straight chain, low density polyethylene is preferably a copolymer of ethylene and one or more α-olefins in which short branched chains are introduced into the straight, principal chain. The number of the branched chains is greater than ordinary low density polyethylene so that the density and the Vicat softening point are relatively low.

As the core layer of the composite film according to the present invention, there may also be used a copolymer (b) of propylene and one or more α-olefins having 2–8 carbon atoms. The Vicat softening point of this copolymer should be 70°–110° C. When the Vicat softening point of the copolymer exceeds 110° C., it becomes difficult to effect stretching at a low temperature and, therefore, it becomes necessary to conduct the stretching at a high temperature. This causes, however, lowering of the heat shrinkability of the film at a low temperature. On the other hand, when a Vicat softening point is below 70° C., the core layer fails to be oriented satisfactorily at a temperature which is suitable for orienting the outer layers between which the core layer is provided, so that the heat shrinkability of the resulting composite film at a low temperature becomes unsatisfactory.

If desired, the low density polyethylene (a) can be used cojointly with the copolymer (b) for the formation of the core layer. Because of their good compatibility with each other, the low density polyethylene (a) and the copolymer (b) may be used in any mixing proportion. However, with the increase of the proportion of the low density polyethylene (a) in the mixture, the tear propagation strength of the composite film becomes higher and the film becomes more flexible. On the other hand, with the increase of the proportion of the copolymer (b), the strength of bonding between the layers of the composite film is increased and the optical properties of the film is improved.

The composite film according to the present invention preferably has a thickness of 8–100 μm (micrometer), more preferably 10–40 μm. It is important that the thickness of the core layer should be 30–80% of the total thickness of the composite film. When the thickness of the core layer is below 30% of the total thickness, the heat shrinkability of the film at a low temperature becomes low and the temperature range to satisfactorily effect heat shrinkage becomes narrow. No improvement in tear propagation strength is also attained. On the other hand, too great a thickness of the core layer in excess of 80% causes lowering of the heat resistance and narrowing of the temperature range in which heat shrinkage can be effected satisfactorily.

It will be apparent to the ordinary skilled in the art that numerous other embodiments are contemplated within the scope of the present invention. It is thus possible to add other polymers or additives to the core layer and/or outer layers as long as they do not adversely affect the heat shrinkability of the resulting composite film. Also possible is to provide one or more intermediate layers between the core layer and the outer layer or layers. For example, since the crystalline polypropylene (c) to be used as the outer layer is compatible with the two polymeric materials (a) and (b), it is possible to reuse, after reclamation, a spent, heat shrinkable composite film of this invention as a portion of the raw material for the formation of the core layer and/or outer layers or as the raw material for the formation of an intermediate layer or layers.

The heat shrinkable composite film of this invention may be fabricated in any desired manner. One preferred fabrication method is as follows: Using a plurality of extruders connected to a laminating die, an unoriented laminate sheet is produced by coextrusion from the above-described polymeric raw materials. The sheet is cooled for solidification and heated again to a temperature suitable to effect stretching. Then, the sheet is oriented at least by three times each in the longitudinal direction (or machine direction) and transverse direction (cross machine direction). Both tenter type and inflation type orienting methods may be adopted, though the latter method is preferred for reasons of ease in obtaining similar heat shrinkability in both longitudinal and transverse directions. If inflation method is to be used, it is necessary to use a multilayer circular die in the extrusion step and to form a tubular laminate sheet by coextrusion. The oriented film is cooled and then heat treated to decrease its spontaneous shrinkability. That is, the oriented film tends to spontaneously shrink when allowed to stand as is. To prevent deformation or occurrence of surface irregularity of the film due to the spontaneous shrinkage, the oriented film is heat treated at a temperature not causing reduction of its desirable characteristics, thereby obtaining a heat shrinkable composite film.

For shrink packaging articles with the composite film according to the present invention, any conventinal packaging line arranged for packaging with polypropylene resin heat shrinkable films may be suitably utilized. The composite film of this invention permits the shrink packaging in a wide temperature range. Because of its high tear propagation strength, the composite film does not break at a portion used as an evacuation port. Further, the high fuse sealing strength of the composite film does not cause breakage of the package during heat shrinking stage.

The heat shrinkable composite film of this invention is especially suited for packaging flat artices, such as notebooks and cards, which tend to be deformed or curled upon receipt of a stress.

Generally, both shrinkage percentage and shrinking force of heat shrinkable films formed of a polypropylene resin increase with the increase of the temperature at which they are shrunken. When packages obtained are found to become loose and poor in tightness or to have a large area in which the article and the film are not contacted with each other, the packaging operation is so controlled as to raise the heat shrinking temperature and to increase the shrinkage percent of the film. ("Portion at which the the packaging film is not contacted with the article to be packaged" is intended to refer to such a portion that is inavoidably formed when the shape of the outer surface of the article is different from the shape of the heat shrinkable film. For example, when an article in the form of a disc is enclosed in a bag which is square in the flattened state, there are unavoidably formed such non-contacted portions at the four corners of the bag. Upon heat shrinking the enclosure, these four corners of the bag remain uncontacted with the article. Such portions are often called "dog ears".) However, the increase of the shrinking temperature causes an increase in shrinking strength. Thus, if heat shrinkage is effected at a temperature exceeding, even only a little, the temperature at which a package with desired tightness is obtained, then the resulting package is deformed due to the excessive shrinking stress. Because such deformation occurs abruptly, it is practically impossible to obtain packages which has excellent tightness and yet has no deformation by a mere control of the shrinking temperature.

Therefore, in shrink packaging flat, deformable articles, it is necessary to use a film whose heat shrinking force no longer increases beyond a certain limit even if heat shrinking temperature is increased to obtain necessary tightness or whose heat shrinking force is decreased with an increase at temperatures higher than a certain limit.

In the conventional heat shrinkable film formed of a polypropylene resin, the heat shrinking force is increased with the increase of the shrinking temperature but finally decreased abruptly when the shrinking temperature reaches a certain level. At such a temperature level, however, the film is fused and whitened. The film cannot be heated to such a temperature.

In a preferred embodiment according to the present invention, heat shrinkable composite film having the abovedescribed structure is so constituted that it shows a heat shrinking force of 30 g or less in both longitudinal and transverse directions at a temperature providing at least 35% of a heat shrinkage percent in both longitudinal and transverse directions. It has been discovered that only if such a film is used, packages having excellent tightness, no curls or deformation and decreased size of portions in which the films are not contacted with the articles.

When a film whose heat shrinking force exceeds 30 g in at least one of the longitudinal and transverse directions at a temperature providing at least 35% of heat shrinkage percentage in both longitudinal and transverse directions is used for packaging a deformable article such as a notebook or card, and when the heat shrink packaging is performed under conditions providing a package having excellent tightness and reduced size of non-contact portions such as dog ears, then curls or deformations are found to be formed in the resulting packages.

In the heat shrinkable film of this invention having the above specific properties, the heat shrinking force decreases with an increase in a temperature in the range which is practically used for shrink packaging and which provides a high shrinkability, though the heat shrinking force becomes excessively high at a low temperature which provides only a low shrinkage percentage and which is not practically used for heat shrink packaging purposes.

For the purpose of the present specification, "a temperature providing at least 35% of heat shrinkage percentage in both longitudinal and transverse directions" is measured in the following manner: The relationship between the heat shrinkage percentage and shrinking temperature of a sample film is first measured in both longitudinal and transverse directions and is illustrated in a graph. From the graph is determined the minimum temperature at which the shrinkage percentage in each longitudinal and transverse direction is at least 35%. This temperature is the sought one. The shrinkage percentage at a given temperature is measured by immersing, for 30 seconds, the sample (100×100 mm) in glycerin maintained at the given temperature, to cause the sample to shrink. The lengths of the resulting sample are measured to calculate the shrinkage percentage in terms of percentage of the shrunken length based on the original length in each direction.

Further, whether or not the heat shrinking force of a film in both longitudinal and transverse directions is 30 g or less at a temperature providing at least 35% of shrinkage percentage in both longitudinal and transverse directions is determined by the following method: The relationship between the heat shrinking force and shrinking temperature of a sample film in each direction is first measured and illustrated in a graph. Then, the relationship between the heat shrinking force and shrinkage percentage in the same shrinking temperature is illustrated in a graph on the basis of the two graphs obtained in the above. From this graph, whether or not the heat shrinking force is 30 g or less in both longitudinal and transverse direction when the shrinkage percentage is 35% or more can be easily determined. The heat shrinking force in each of the longitudinal and transverse directions at a given temperature is measured by the following method: A sample film is cut to obtain a tape with a width of 10 mm and extending in parallel with the longitudinal direction of the film. Another tape with a width of 10 mm is also prepared by cutting the sample in parallel with the transverse direction of the film. Each tape is clamped between a pair opposing chucks of a strain gauge, spaced apart by a distance of 40 mm, such that the tape extends therebetween in the tension-free and slack-free state. The tape was then immersed for 30 seconds in glycerin maintained at the given temperature. The force generated as a result of the shrinkage is measured.

With the heat shrinkable composite film having the specific shrinking properties as defined above, a flat article such as a notebook or a card is packaged in the following manner. The film is first designed to have an area which is no more than 1.6 times the external surface area of the article to be packaged. By specifying the size of the film in the above manner, the article is not curled or bent upon being packaged therewith. The package obtained also has an excellent tightness and a decreased area of portions at which the film is not contacted with the article.

When a film having more than 1.6 times the surface area of the article is employed, good packages cannot be obtained because of the failure to provide tightness in the packages and of the formation of large non-contact portions such as dog ears.

The lower limit of the size of the film is determined by consideration of workability of packaging. Too small a size adversely affect the workability and it is desired to provide a surplus in the size of the film. Generally, an area of at least 1.2 times the external surface area of the artice to be packaged gives good results.

Enclosing of the article with the film may be effected by any conventional method, such as a four sides seal method utilized for automatic packaging of flat articles such as notebooks and cards, a pillow method used in high speed automatic packaging or an L-shaped seal method used in manual packaging. It is without saying that an evacuation port is provided in the film to effect heat shrinking packaging.

The enclosure thus obtained is then subjected to heat shrinking conditions. It is important that the heat shrinking be performed so that the film can be shrunken with a shrinkage percentage of at least 35% in both the longitudinal and transverse directions. By this, packages with excellent tightness and without no curls or deformation may be obtained. If the heat shrinking conditions are such that the film cannot be shrunken with a shrinkage percentage of 35% or more in at least either one of the longitudinal and transverse directions, packages with desired tightness cannot be obtained.

The heat shrinkage may be effected in any known method such as by using a heat shrinking tunnel. By controlling the temperature within the tunnel, passing speed through the tunnel or the like conditions, the heat shrinkable composite film can be shrunken with a shrinkage percentage of at least 35% in both longitudinal and transverse directions.

Whether or not a given heat shrinking condition can provide a heat shrinkable film with a shrinkage percentage of at least 35% can be determined in the following manner: The sample film is firmly fitted to a ring holder having an inside diameter of 200 mm. The film is slackened to the extent that the diameter of the film is 308 mm. Then the film is subjected to the given heat shrinking condition, e.g. by passing the film through a heat shrinking tunnel under the given shrinking conditions. Thereafter, the shrunken film is observed to see whether the film mounted on the ring becomes tense. If the film fixed to the holder is tensed as a result of the shrinking treatment, then the film is regarded to have been shrunken with a shrinkage percentage of 35% $((308-200)/308\times 100\%)$ or more.

It is advisable to use the heat shrinkable composite film having a thickness of 10–40 μm for packaging flat articles such as notebooks and cards while preventing the formation of curls.

The heat shrinkable composite film according to the present invention exhibits a high shrinkability even at a low temperature and has a wide range of temperatures at which it can be shrunken in an optimum manner.

Further, it has a high tear propagation strength and fuse sealing strength so that no breakage of the package is caused during or after the heat shrink packaging operation. Moreover, the composite film of this invention has excellent clarity, gloss and water-proofing property and does not cause environmental pollution. Additionally, since the layers constituting the composite film are compatible with each other, chips, spent films or disqualified films can be reused after reclamation as a raw material for the production of the film of this invention. These various desirable properties of the composite films of this invention permit the use thereof in shrink packaging a variety of articles, especially for packaging flat articles which tend to be curled or deformed upon shrink packaging.

The following examples will further illustrate the present invention.

EXAMPLE 1

A three-layered, unoriented, tubular laminate raw film was prepared from a crystalline ethylene-propylene copolymer having a melting point of 138° C. for the two, outer or surface layers and a straight chain, low density polyethylene resin having a density of 0.900 g/cm$^3$ and a Vicat softening point of 67° C. for the intermediate, core layer by coextrusion through a three-layer circular die connected to three extruders. The extrudate was immediately cooled by a conventional water cooling method. The raw film had a thickness of about 200 μm with the proportion of the thickness of one outer layer, core layer and the other outer layer being 1:2:1. The raw film was then biaxially stretched by an inflation method in both longitudinal and transverse directions each by 4.0 times. The resulting biaxially oriented film was thermally treated under relaxed conditions to effect setting of the film, thereby to obtain a heat-shrinkable laminate film having a thickness of about 15 μm.

Using this heat-shrinkable laminate film, automatic heat shrink package of cupped instant noodle was effected in a heating tunnel maintained at 150° C. Uniformly finished heatshrink shrink packages were obtained even when the temperature within the tunnel was fluctuated by about ±15° C. from 150° C. Further, the film did not stick, during heat shrinking, to the surface of the cup to be packaged and, therefore, there were observed no portions in the package which remained unshrunken. Heat shrink packages are apt to be broken at the portion used as an evacuation port during shrink packaging. However, in the packages obtained in the above manner, no such breakage was caused during post treatments such as conveyance on a belt conveyer.

Comparative Example 1

An unoriented laminate raw film was prepared in the same manner as that in Example 1 except that a linear low density polyethylene resin having a density of 0.919 and a Vicat softening point of 90° C. was used as the core layer. The thickness of each of the layers of the thus obtained raw film was the same as that of the film of Example 1. The raw film was then biaxially stretched by a conventional inflation method. However, the stretching was able to be started only when the raw film was heated to a temperature near the melting point of the linear, low density polyethylene resin and was not able to be effected in a stable manner.

Example 2

A three-layered, unoriented, tubular laminate raw film was prepared from a crystalline polypropylene resin having a melting point of 138° C. for the two, outer or surface layers and a copolymer having a Vicat softening point of 78° C. for the intermediate, core layer by coextrusion in the same manner as that in Example 1. The copolymer used was obtained by copolymerizing about 15% by weight of a mixture of -olefins having 2 and 4 carbon atoms with propylene. The raw film had a thickness of about 240 μm with the proportion of the thickness of one outer layer, core layer and the other outer layer being 1:2:1. The raw film was then biaxially stretched and thermally set in the same manner as that in Example 1, thereby to obtain a heat-shrinkable laminate film of about 15 μm thick having a slippery surface.

Using this heat-shrinkable laminate film, automatic heat shrink package of snack food-containing paper boxes was effected in a heating tunnel maintained at 155° C. Uniformly finished, tight packages having heat shrunken film coats free of wrinkles in corner portions were obtained even when the temperature within the tunnel was fluctuated by about ±10° C. from 155° C. Further, the seamed portions of the packages formed by fuse sealing showed a high strength and no breakage in the portions used as gas evacuation ports were caused even when the packages were rubbed with each other.

Example 3

A three-layered, unoriented, tubular laminate raw film was prepared from a crystalline polypropylene resin having a melting point of 145° C. for the two, outer or surface layers and a copolymer obtained by copolymerizing about 10% by weight of a mixture of α-olefins with 2 and 4 carbon atoms with propylene and having a Vicat softening point of 103° C. for the intermediate, core layer by extrusion in the same manner as that in Example 1. The raw film had a thickness of about 310 μm with the proportion of the thickness of one outer layer, core layer and the other outer layer being 1:4:1. The raw film was then biaxially stretched and thermally set in the same manner as that in Example 1, thereby to obtain a heat-shrinkable laminate film of about 20 μm thick having a slippery surface.

Using this heat-shrinkable laminate film, heat shrink package of books was effected in a heating tunnel maintained at 160° C. Uniformly finished, tight packages having heat shrunken film coats free of wrinkles in corner portions were obtained even when the temperature within the tunnel was fluctuated by about ±10° C. from 160° C. Further, the seamed portions of the packages formed by fuse sealing showed a high strength and no breakage was caused even when the packages were dropped on the floor. The portions used as gas evacuation ports were not broken even when the packages were rubbed with each other.

Comparative Examples 2 and 3

A three-layered, unoriented, tubular laminate raw film (Comp. 2) was prepared from a crystalline polypropylene resin having a melting point of 154° C. for the two, outer or surface layers and a copolymer of propylene and α-olefins having a Vicat softening point of 91° C. for the intermediate, core layer by extrusion in the same manner as that in Example 1. A similar raw film (Comp. 3) was also prepared in the same manner as above except that a polypropylene having a melting point of 132° C. was used as the outer layers. Each of the two raw films had a thickness of about 240 μm with the proportion of the thickness of one outer layer, core layer and the other outer layer being 1:3:1. The raw films were then biaxially stretched in the same manner as that in Example 1. The raw film of Comp. 2 required a higher stretching temperature than that in Example 2 or 3, while the film of Comp. 3 permitted the use of a lower temperature than that in Example 2 or 3. After thermally setting the biaxially oriented films, heat shrink package of snack foodcontaining boxes was effected in the same manner as that in Examle 2. The heat shrinkable film of Comp. 2 was poor in shrinkability even at a high shrinking temperature so that wrinkes were formed in corner portions. While the heat shrinkable film of Comp. 3 showed good heat-shrinkability at a low temperature, it has a disadvantage because the temperature range within which it exhibits suitable shrinkability is very narrow.

Comparative Examples 4 and 5

A three-layered, unoriented, tubular laminate raw film (Comp. 4) was prepared from a crystalline polypropylene resin having a melting point of 142° C. for the two, outer or surface layers and a copolymer of propylene and α-olefins having a Vicat softening point of 119° C. for the intermediate, core layer by extrusion in the same manner as that in Example 1. A similar raw film (Comp. 4) was also prepared in the same manner as above except that a copolymer of propylene and α-olefins having a Vicat softening point of 68° C. was used as the core layer. Each of the two raw films had a thickness of about 310 μm with the proportion of the thickness of one outer layer, core layer and the other outer layer being 1:3:1. The raw films were then biaxially stretched in the same manner as that in Example 1. The raw film of Comp. 4 required a higher stretching temperature than that in Example 2 or 3. While the film of Comp. 5 permitted the use of a lower temperature than that in Example 2 or 3, it was very difficult to conduct the stretching operation in a stable manner. After thermally setting the resulting biaxially oriented films, heat shrink package of books was effected in the same manner as that in Examle 3. The heat shrinkable film of Comp. 4 was poor in shrinkability in a low shrinking temperature so that wrinkes were formed in corner portions. The film of Comp. 4 was also disadvantageous because of its narrow range of operativity with respect to temperatures at which it exhibited suitable shrinkability. While the heat shrinkable film of Comp. 5 showed good heat-shrinkability at a low temperature, its binding force was low and it failed to provide tight packages.

Example 4

A three-layered, unoriented, tubular laminate raw film was prepared from a crystalline polypropylene resin having a melting point of 138° C. for the two, outer or surface layers and a 1:1 mixture of a copolymer of a straight chain low density polyethylene having a density of 0.900 g/cm$^3$ and a Vicat softening point of 67° C. and a copolymer of propylene and α-olefins having a Vicat softening point of 78° C. (the same copolymer as used in Example 2) for the intermediate, core layer by extrusion in the same manner as that in Example 1. The raw film had a thickness of about 240 μm with the proportion of the thickness of one outer layer, core layer and the other outer layer being 1:2:1. The raw film was then biaxially stretched and thermally set in the same manner as that in Example 1, thereby to obtain a heat-shrinkable laminate film having a thickness of about 15 μm.

Using this heat-shrinkable laminate film, heat shrink package of window boxes was effected in a heating tunnel maintained at 155° C. Uniformly finished, tight packages having transparent, heat shrunken film coats free of portions whitened by fusion and free of wrinkles in corner portions were obtained even when the temperature within the tunnel was fluctuated by about ±10° C. from 155° C. Further, the seamed portions of the packages formed by fuse sealing showed a high strength. The portions used as gas evacuation ports were not broken even when the window portions of the packaged boxes were pushed with a finger.

Example 5

A four-layered, unoriented, tubular laminate raw film was prepared from a crystalline polypropylene resin having a melting point of 145° C. for the two, outer or surface layers, a 7:3 mixture of a copolymer of a straight chain low density polyethylene having a density of 0.900 g/cm$^3$ and a Vicat softening point of 70° C. and a copolymer obtained by copolymerizing about 10% by weight of a mixture of α-olefins with 2 and 4 carbon atoms with propylene and having a Vicat softening point of 101° C. for a first core layer and a regenerated resin composition for a second core layer by extrusion through a four-layer circular die connected to four extruders. The regenerated resin composition was obtained by regenerating used films obtained in this example. The raw film had a thickness of about 310 μm with the proportion of the thickness of one outer layer, first core layer, second core layer and the other outer layer being 1:3:1:1. The raw film was then biaxially stretched and thermally set in the same manner as that in Example 1, thereby to obtain a transparent heatshrinkable laminate film having a thickness of about 20 μm.

Using this heat-shrinkable laminate film, heat shrink package of books was effected in a heating tunnel maintained at 160° C. Five books were packaged together. Uniformly finished, tight packages having transparent, heat shrunken film coats free of portions whitened by fusion and free of wrinkles in corner portions were obtained eve when the temperature within the tunnel was fluctuated by about ±10° C. from 160° C. Further, the seamed portions of the packages formed by fuse sealing showed a high strength and no breakage was caused at the seamed portion even when the packages were folded. The portions used as gas evacuation ports were not broken even when the packages were rubbed with each other.

Comparative Examples 6 and 7

A three-layered, unoriented, tubular laminate raw film (Comp. 6) was prepared from a crystalline polypropylene resin having a melting point of 154° C. for the two, outer or surface layers and a 1:1 mixture of a straight chain low density polyethylene having a density of 0.900 g/cm$^3$ and a Vicat softening point of 70° C. and a copolymer of propylene and α-olefins having a Vicat softening point of 91° C. for the intermediate, core layer by extrusion in the same manner as that in Example 1. A similar raw film (Comp. 7) was also prepared in the same manner as above except that a crystalline polypropylene having a melting point of 132° C. was used as the two outer layers. Each of the two raw films had a thickness of about 240 μm with the proportion of the thickness of one outer layer, core layer and the other outer layer being 1:3:1. The raw films were then biaxially stretched in the same manner as that in Example 1. The raw film of Comp. 6 required a higher stretching temperature than that in Example 4 or 5, while the film of Comp. 7 permitted the use of a lower temperature. After thermally setting the resulting biaxially oriented films, heat shrink package of snack food-containing boxes was effected in the same manner as that in Examle 2. The heat shrinkable film of Comp. 6 was poor in shrinkability not only at a low shrinking temperature but also at a high shrinking temperature so that wrinkes were formed in corner portions. The film of Comp. 7 had a suitable shrinkability at low temperature but was poor in heat resistance and, therefore, it was disadvantageous because of its narrow range of operativity with respect to temperatures at which it exhibited suitable shrinkability.

Comparative Examples 8 and 9

A three-layered, unoriented, tubular laminate raw film (Comp. 8) was prepared from a crystalline polypropylene resin having a melting point of 142° C. for the two, outer or surface layers and a 1:1 mixture of a straight chain low density polyethylene having a density of 0.919 g/cm$^3$ and a Vicat softening point of 90° C. and a copolymer of propylene and α-olefins having a Vicat softening point of 91° C. for the intermediate, core layer by extrusion in the same manner as that in Example 1. A similar raw film (Comp. 9) was also prepared in the same manner as above except that a 1:1 mixture of a straight chain polyethylene having a density of 0.900 and a Vicat softening point of 70° C. and a copolymer of propylene and α-olefins having a Vicat softening point of 119° C. was used as the core layer. Each of the two raw films had a thickness of about 240 μm with the proportion of the thickness of one outer layer, core layer and the other outer layer being 1:3:1. The raw films were then biaxially stretched in the same manner as that in Example 1. The raw films of Comp. 8 and 9 required a high stretching temperature. After thermally setting the resulting biaxially oriented films, heat shrink package of snack foodcontaining boxes was effected in the same manner as that in Comparative Example 6 or 7. The heat shrinkable films of Comp. 8 and Comp. 9 were poor in shrinkability at a low shrinking temperature so that wrinkes were formed in corner portions. These films had also narrow range of operativity with respect to temperatures at which they exhibited suitable shrinkability.

Comparative Examples 10 and 11

Three-layered, unoriented, tubular laminate raw films were prepared in the same manner as that in Example 4 except that the proportion of the thickness of the respective layers was changed from 1:2:1 to 2:1:2 in the case of Comparative Example 10 (Comp. 10) and to 0.5:9:0.5 in the case of Compartive Example 11 (Comp. 11). Each of the two raw films had a thickness of about 240 μm. The raw films were then biaxially stretched in the same manner as that in Example 1. The raw film of Comp. 10 was poor in orientability at a low stretching temperature, whereas the film of Comp. 11 could be stretched at a low temperature. After thermally setting the resulting biaxially oriented films, heat shrink package of window boxes was effected in the same manner as that in Example 4. The heat shrinkable film of Comp. 11 was poor in shrinkability at a low shrinking temperature and had a narrow range of operativity with respect to temperatures at which it exhibited suitable shrinkability. Further, the tear propagation strength was low so that the package was easily broken when pushing the window portion of the box with a finger. The heat shrinkable film of Comp. 11 was poor in heat resistance and had a narrow operativity range.

Comparative Example 12

A three-layered, unoriented, tubular laminate raw film was prepared from a crystalline ethylene-propylene copolymer having a melting point of 138° C. for the two, outer layers and the core layer by coextrusion in the same manner as that in Example 1. The raw film had a thickness of about 200 $\mu$m. The raw film was then biaxially stretched and thermally set in the same manner as that in Example 1, thereby to obtain a heatshrinkable laminate film having a thickness of about 15 $\mu$m. Using this heat-shrinkable laminate film, automatic heat shrink package of cupped noodle was effected in a heating tunnel maintained at 160° C. When the temperature within the heating tunnel was lowered by 5° C., heat shrinkability became poor so that fairly finished packages were failed to be produced. When the temperature within the heating tunnel was raised to 165° C., the film was fused and turned white. Thus it was very difficult to smoothly conduct the packaging operation with this film. Further, heat shrinkage proceeded so rapidly before inflation of sealed package that some of the portions at which the film was contacted with the cup remained unshrunken. Furthermore, the portions used as gas evacuation ports tended to be broken during post handling.

Example 6

Figure 2:
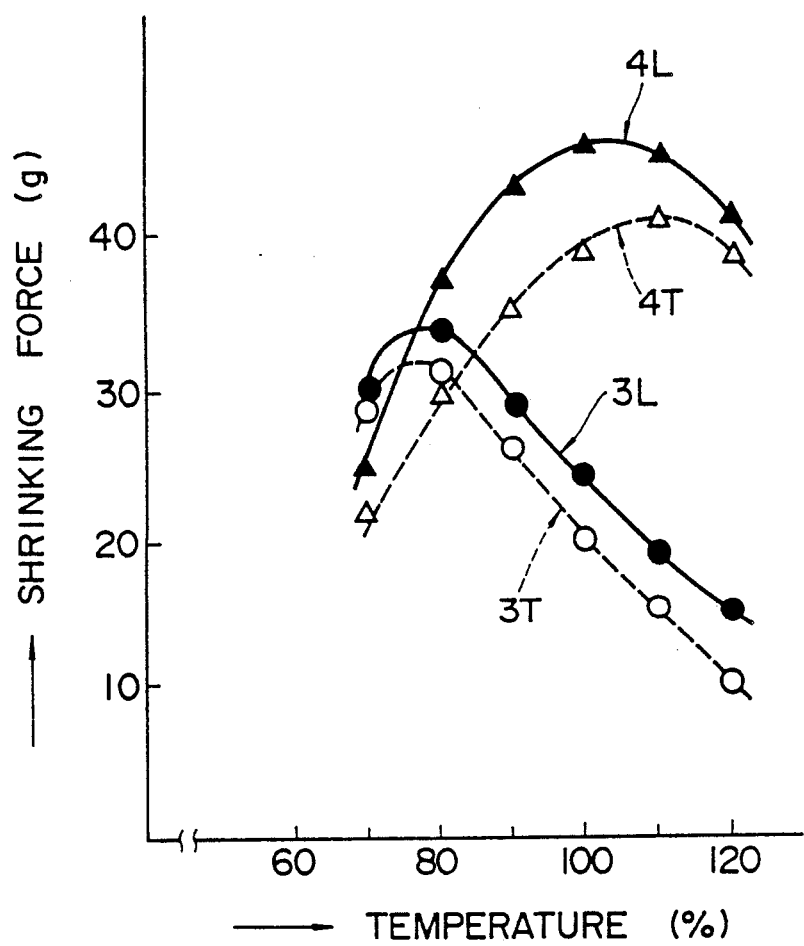
FIG. 2 is a graph showing the relationship between shrinking temperature and shrinking force of the films of FIG. 1.
Figure 3:
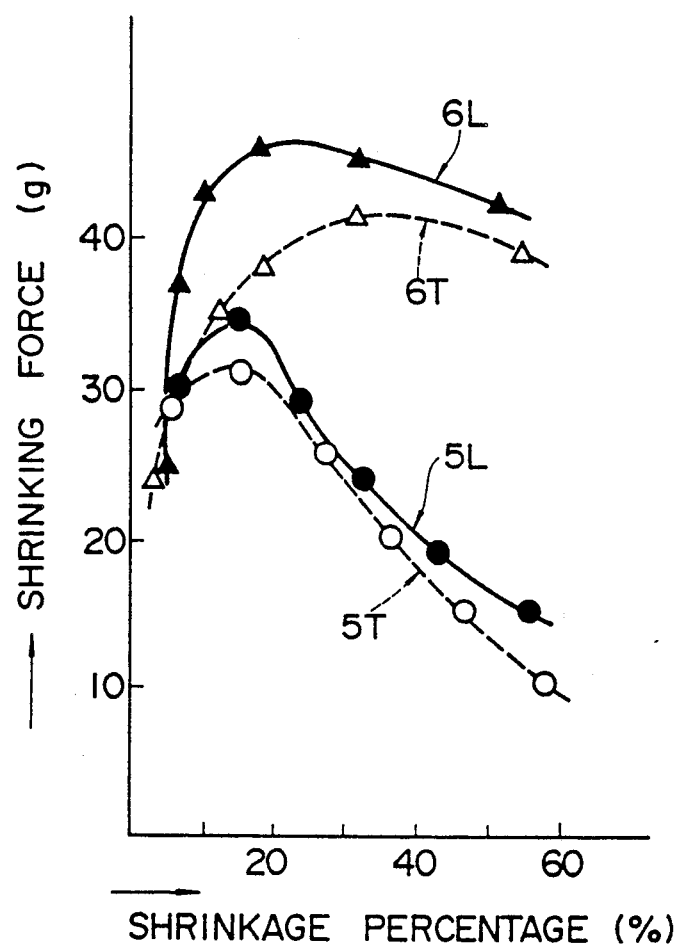
FIG. 3 is a graph showing the relationship between the shrinkage percentage and shrinking force of the films of FIG. 1.

A heat shrinkable three layered film composed of a core layer having a thickness of 9 $\mu$m and formed of a linear, low density polyethylene having a density of 0.905 g/cm$^3$ and a Vicat softening point of 75° C., and two outer layers each having a thickness of 3 $\mu$m and formed of a crystalline polypropylene having a melting point of 138° C. was prepared in the same manner as that in Example 1. The thus obtained film was tested for its shrinkability and shrinking force. The results are illustrated in FIGS. 1, 2 and 3 which show a relationship between the shrinking temperature and shrinkage percentage (degree of shrinkage), a relationship between the shrinking temperature and shrinking force and a relationship between the shrinkage percentage and shrinking force (stress), respectively. The curves 1L, 3L and 5L each represent a shrinking property in the longitudinal direction of the film of this example, whereas the curves 1T, 3T and 5T each represent a shrinking property in the transverse direction of the film of this example. From the results shown in FIGS. 1-3, it is appreciated that the heat shrinkable film of this example meets with the requirement that the heat shrinking force at a temperature providing a shrinkage percentage of at least 35% in both longitudinal and transverse directions is not greater than 30 g.

The heat shrinkable film was shaped into a square packaging bag with a size of 155×155 mm by a conventional Lshaped sealing method. This bag was then used for packaging a paper disc having a radius of 70 mm and a thickness of 2 mm. The bag had less than 1.6 times the exterior surface area of the disc. The shrink packaging was performed by passing the disc enclosed in the bag through a heating tunnel having a length of 2 m and maintained at 180° C. at a rate of 0.5 m per second. It was necessary to maintain the heating tunnel at 145° C. in order to cause the heat shrinkable film of this example to be shrunken with a shrinkage percentage of 35% in both longitudinal and transverse directions when passed through the heating tunnel in 4 seconds.

The resulting package was free of loose portions and showed excellent tightness without deformation of the disc. The size of the "dog ears" (corner portions where the film does not contact with the disc) of the package was small.

Comparative Example 13

Example 6 was repeated in the same manner as described except that a single layered, heat shrinkable film with a thickness of 15 $\mu$m and formed of a crystalline propylene resin was used in place of the three layered film. The shrinkability and shrinking force characteristics of this film are shown in FIGS. 1-3, wherein the curves 2L, 4L and 6L each represent the shrinking property in the longitudinal direction of the film of this comparative example, whereas the curves 2T, 4T and 6T each represent the shrinking property in the transverse direction of the film. From the results shown in FIGS. 1-3, it is appreciated that the heat shrinkable film fails to meet with the requirement that the heat shrinking force at a temperature providing a shrinkage percentage of at least 35% in both longitudinal and transverse directions should not be greater than 30 g. It was necessary to maintain the heating tunnel at 160° C. in order to cause the heat shrinkable film to be shrunken with a shrinkage percentage of 35% in both longitudinal and transverse directions when passed through the same heating tunnel as used in Example 6 in 4 seconds.

The heat shrinkable film was shaped into a square packaging bag and used for packaging a paper disc in the same manner as that in Example 6. There was caused a curl in the resulting package at any temperature within the heating tunnel from 160° C. to a temperature above which the film was fused and whitened. The deformation of the disc is considered to be prevented if the temperature within the tunnel is lowered or if the packaging bag with a larger size is used. However, this will cause other problems such as loosness (lack of tightness) of the package and formation of big "dog ears".

Example 7

With the heat shrinkable film of Example 6, a notebook having a length of 250 mm, a width of 180 mm and a thickness of 4 mm was packaged in the manner similar to Example 6. The bag formed by the L-shaped sealing method had a length of 300 mm and a width of 200 mm. The surface area of the bag is thus less than 1.6 times that of the notebook. The resulting package was free of curls and showed excellent tightness.

Comparative Example 14

Example 7 was repeated in the same manner as described except that the bag used had a length of 340 mm and a width of 240 mm. The surface area of this bag is thus more than 1.6 times that of the notebook to be packaged. While no curls were formed in the resulting package, it lacked tightness. Even when the temperature within the heating tunnel was increased, it was not possible to improve the tightness. Rather, there was caused whitening of the film.

Comparative Example 15

Example 7 was repeated in the same manner as described except that the temperature within the heating tunnel was maintained at 135° C. which was insufficient to cause the film to shrink with a shrinkage percentage of 35% or more in both longitudinal and transverse directions. The resulting film was loose and lacked tightness.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

I claim:

1. A heat shrinkable composite film comprising:

A. a core comprising at least one of (a) a low density polyethylene resin having a density of 0.890-0.905 g/cm$^3$ and a Vicat softening point of 60°-80° C. and (b) a copolymer of propylene and at least one other α-olefin having 2-8 carbon atoms having a Vicat softening
   B. at least one intermediate layer laminated over at least one of the opposite surfaces of said core layer to form an intermediate multilayer film; and
   C. two outer layers laminated over the two opposite outer surfaces of said intermediate multilayer film and comprising a crystalline polypropylene resin having a melting point of 135°-150° C.

2. A heat shrinkable composite film as claimed in claim 1 including two intermediate layers each laminated to an opposite surface of said core.

3. A heat shrinkable composite film as claimed in claim 1 wherein said intermediate layer comprises a blend of said core and two outer layers.

* * * * *